(12) United States Patent
Ruiz Floriach et al.

(10) Patent No.: US 9,776,438 B2
(45) Date of Patent: Oct. 3, 2017

(54) MOTOR CHARACTERIZATION IN A PRINTER

(71) Applicant: HEWLETT-PACKARD DEVELOPMENT COMPANY, L.P., Houston, TX (US)

(72) Inventors: Carles Ruiz Floriach, Barcelona (ES); Carlos Felip Aragon, Barcelona (ES); Raimon Castells de Monet, Barcelona (ES); Xavier Domingo Reguant, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/030,409

(22) PCT Filed: Nov. 21, 2013

(86) PCT No.: PCT/US2013/071127
§ 371 (c)(1),
(2) Date: Apr. 19, 2016

(87) PCT Pub. No.: WO2015/076799
PCT Pub. Date: May 28, 2015

(65) Prior Publication Data
US 2016/0279981 A1    Sep. 29, 2016

(51) Int. Cl.
*B41J 15/16* (2006.01)
*B41F 33/06* (2006.01)
*H02P 27/12* (2006.01)
*B65H 23/18* (2006.01)

(52) U.S. Cl.
CPC .............. *B41J 15/16* (2013.01); *B41F 33/06* (2013.01); *H02P 27/12* (2013.01); *B65H 23/18* (2013.01); *B65H 2515/32* (2013.01); *B65H 2555/24* (2013.01); *B65H 2557/61* (2013.01); *B65H 2557/63* (2013.01); *B65H 2801/03* (2013.01); *B65H 2801/15* (2013.01)

(58) Field of Classification Search
CPC ........ B41J 13/0009; B41J 15/04; B41J 11/42; B41J 11/00; B41J 11/0045; B41J 2/04501; B41J 2/16526; B41J 11/005; B41J 15/16
See application file for complete search history.

(56) References Cited

U.S. PATENT DOCUMENTS

| | | |
|---|---|---|
| 4,994,986 A | 2/1991 | Cihiwsky et al. |
| 5,367,236 A | 11/1994 | Salazar |
| 6,054,835 A | 4/2000 | Thiemann et al. |
| 6,336,007 B1 | 1/2002 | Sugisaki et al. |

(Continued)

OTHER PUBLICATIONS

Brushless DC Motors for Laser Printers, Copiers, Air Moving Devices; See webpage. http://www.nidecamerica.com/admtypem/40m58m.pdf >.

(Continued)

*Primary Examiner* — Lamson Nguyen
(74) *Attorney, Agent, or Firm* — HP Inc. - Patent Department

(57) ABSTRACT

A printer is disclosed. The printer has a media control system to control the tension in media loaded in a paper path in the printer. A motor in the media control system is characterized to determine a plurality of motor characteristics. The media control system uses the motor characteristics to adjust the control signal to the motor.

15 Claims, 6 Drawing Sheets

(56) References Cited

U.S. PATENT DOCUMENTS

| | | |
|---|---|---|
| 6,722,754 B1 | 4/2004 | Delaney et al. |
| 6,747,431 B1 | 6/2004 | Marra et al. |
| 7,311,245 B2 | 12/2007 | Mason et al. |
| 2009/0185197 A1 | 7/2009 | Wilson et al. |

OTHER PUBLICATIONS

International Searching Authority. ISA/KR. dated Aug. 20, 2014.
Application No. PCT/US2013/071127. Filing date Nov. 21, 2013.

MOTOR CHARACTERIZATION IN A PRINTER

BACKGROUND

Many printers use media that is fed through the paper path of the printer from a roll or web of media. The paper path includes a print zone where ink or a marking material is deposited onto the media. In some cases a take-up spindle is used to capture and roll up the media after printing. The tension, speed and position of the media is controlled by a servo system that includes a number of motors. In some printers the servo system uses three motors: one coupled to the input spindle in which the media roll is loaded, one coupled to a drive roller and one coupled to the output spindle in which the media is collected or to an output tension roller.

DETAILED DESCRIPTION

In today's printers, accurate media advance and control helps to achieve proper print quality. Sometimes motors of the same model have different characteristics and behave differently. For example, the ratio between motor torque and applied voltage, and the voltage at which the motor starts spinning are different fir different motors of the same model. An error of up to 80% of the desired tension applied on the media has been observed among printers loaded with the same media due to motor characteristic variability.

When there is such a large error in the tension applied to the media a number of problems can occur. For example, wrinkles can be formed in the media and/or the media can crash against the print heads causing the printhead to fail. In addition bad media advancement can cause marks on the substrate creating unusable prints.

Currently the media control system uses a midpoint value for each of the motor characteristics. This operational midpoint allows for the proper control of an average motor. However when motors are used that have motor characteristics that are on the boundaries of the specified range for a given motor property, the control system is unable to control the tension in the media to within the proper values.

In one example of the invention, the motors in the media control system are characterized and the characterized values are used in the media control system. The motors can be characterized during the manufacturing process, during use or both. The motors can be characterized by measuring the acceleration and deceleration of the motors with different pulse width modulation (PWM) values. The motors can be characterized in both the forward and reverse rotational directions.

Each motor has an encoder coupled to the motor shaft. The encoder produces a value indicating the current shaft position. The variation in position over time can be used to calculate the rotational velocity of the shaft. The variation in velocity over time can be used to calculate the rotational acceleration of the shaft. The rotational inertia of the system is known. Torque is equal to the rotational acceleration times the rotational inertia and therefore can be calculated at the different PWM values.

Using the measured values, the motor's torque constant, the positive and negative voltage values between which the motors don't turn, and the motor's friction for both directions can be determined. The values calculated for each motor will be entered into memory and the media control system will use the stored values instead of midpoint values. This allows the media control system to operate with less variation in the tension in the media.

Figure 1:
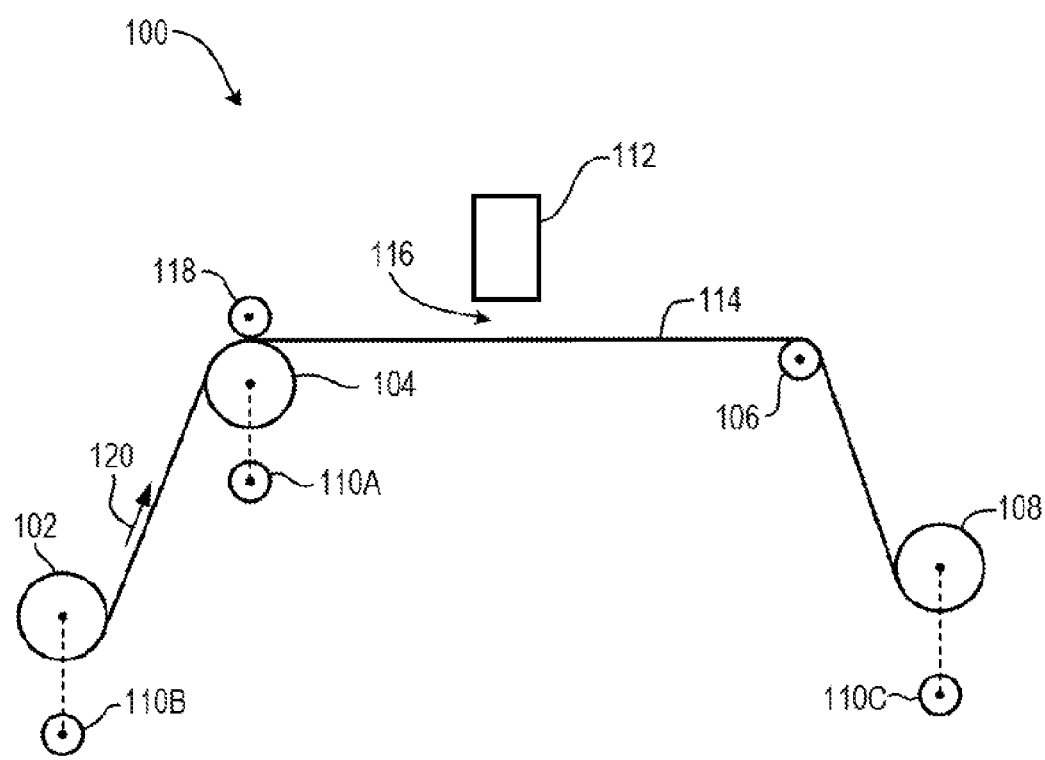
FIG. 1 is as diagram of an example printer 100.

FIG. 1 is a diagram of an example printer 100. Printer 100 comprises a supply spindle 102, a chive roller 104, a pinch roller 118, one or more printheads 112, an idler roller 106, a take-up spindle 108 and three motors 110A, 110B and 110C. A paper path starts at the supply spindle 102, then runs between drive roller 104 and pinch roller 118, underneath the printheads 112, around idler roller 106 and onto take-up spindle 108. A print zone 116 is underneath printheads 112. Media 114 is shown loaded in the paper path. During printing, the media travels in a print direction as shown by arrow 120.

Printheads 112 may travel across the media (in and out of the plain of the paper) during printing or may be a page wide array of printheads that stretch across the width of the media. The three motors 110A, 110B and 110C are coupled to the supply spindle 102, the drive roller 104 and the take-up spindle 108 respectively, with a transmission. The motors may be coupled to their respective spindles using any suitable transmission. For example the transmission may directly couple the motor to the spindle, may use a belt drive, may use a set of gears, may have a clutch or the like. A media moving device is a mechanical device that interacts with the media to move the media in the paper path. The supply spindle 102, the drive roller 104 and the take-up spindle 108 are examples of media moving devices.

In one example the three motors 110A, 110B and 110C are brushless AC motors. There is an encoder integrated into each of the three motors. The encoder outputs a signal indicating the current rotational position of the rotor. Each motor also has a printed circuit assembly (PCA) integrated into the motor. The PCA controls the rotational speed of the motor. The input to the PCA is a pulse width modulation (PWM) signal that corresponds to the voltage applied to the motor. The PWM signal is given as a percentage of the maximum voltage. A PWM signal of zero corresponds to zero voltage and a PWM of one corresponds to the maximum voltage.

The media control system sends the PWM signal to each of the three motors 110A, 110B and 110C to control the tension in the media. The tension is typically set at a different value for different types of media, for example paper, cloth or the like. The media control system uses motor characteristics to determine the appropriate PWM signal for each motor. The motor characteristics include at least the following characteristics: a torque constant, the positive and negative voltage values between which the motors don't turn and the motor's friction for both directions. The different characteristics will be determined for each of the three motors and stored into a permanent memory. By using the determined characteristics for each motor instead of, or in addition to, an average or midpoint value, the media control system can operate with less variation in the tension in the media.

As described above, the different motor characteristics may be determined during the manufacturing process, out in the field or both. During the manufacturing process the motor can be characterized on a test stand or after it has been installed in the printer. When a motor is tested on a test stand, the transmission efficiency coupling the motor to the spindle inside the printer is not characterized. When a motor is tested after it is installed in a printer, the efficiency of the transmission coupling the motor and the media moving device can be characterized. When a motor is being tested inside the printer, the input spindle or take-up spindle may be empty or may be loaded with media. When a spindle is loaded with media the inertia of the spindle plus the media will be used to determine the torque of the motor. When spindle is not loaded with media the inertia of the spindle will be used to determine the torque of the motor. Typically the motor coupled to the drive roller is tested without media in the paper path.

In one example, the first step when testing a motor is to determine the PWM signal needed to start the motor rotating. This can be determined experimentally by starting with a zero PWM signal and increasing the PWM signal until the motor begins to turn. The PWM value that is required to start the motor turning is known as the starting PWM value. The starting PWM value is determined for the forward and reverse directions for the motor. The maximum PWM signal minus the starting value gives the range of PWM signals to be tested (i. e. the test range). The test range is divided into a number of steps. The number of steps in the test range can vary. In one example the number of steps is between 5 and 20, for example 11 steps. The step size is equal to the test range divided by the number of steps.

In another example, the starting PWM value is determined using the graphed results (as described below). In this example an initial PWM value is used. The initial PWM value is selected as a relatively low PWM signal in which the motor will turn. The maximum PWM signal minus the initial value gives the range of PWM signals to be tested (i. e. the test range). The test range is divided into a number of steps. The number of steps in the test range can vary. In one example the number of steps is between 5 and 20, for example 11 steps. The step size is equal to the test range divided by the number of steps In one example the PWM signal is given as a percentage of the maximum voltage. A PWM signal of zero corresponds to zero voltage and a PWM signal of one corresponds to the maximum voltage. When the initial PWM value is 0.4 the PWM range is from 0.4 through 1.0 (or a range of 0.6). When using 11 steps the step size is 0.6/11=0.055 PWM. At each PWM step, beginning with the starting or initial PWM value, the PWM signal is tested multiple times. The results for each test cycle can be averaged together or the mean value can be used.

Figure 2:
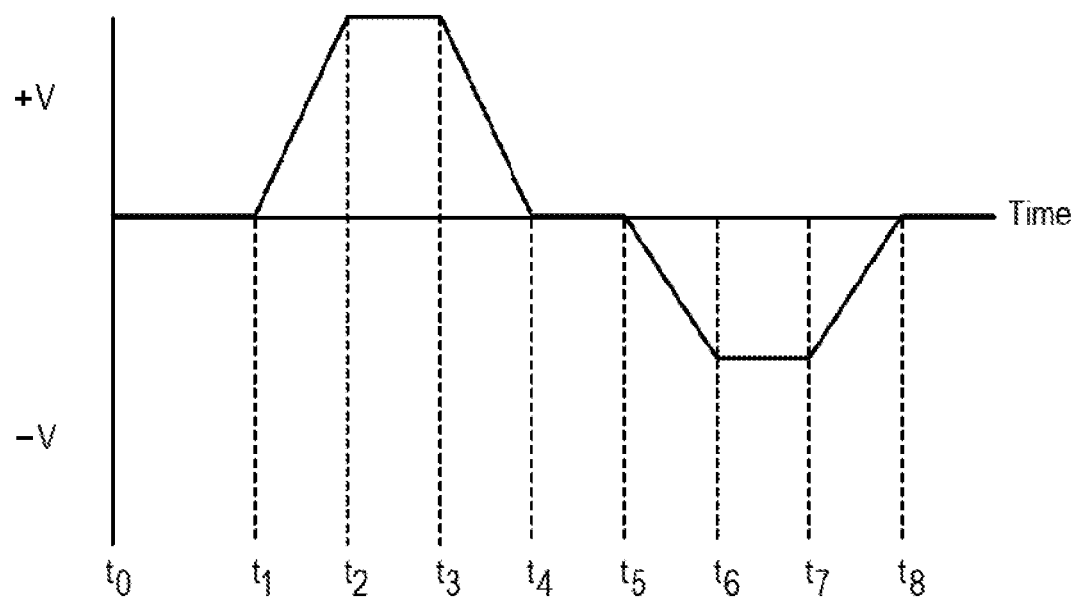
FIG. 2 is an example plot of the variation in rotational velocity during a PWM test cycle.

The PWM signal is varied 4 times for each test repetition or cycle. FIG. 2 is an example plot of the variation in rotational velocity during a PWM test cycle. The vertical axis is the rotational velocity of a motor under test. The horizontal axis is time. The difference between each of the times is typically a constant and is between 0.5 seconds and 5.0 seconds, for example 1 second.

At time $t_0$ the PWM signal is at a test point and the motor is turning at a constant velocity. At time $t_1$ the PWM signal is increased by the step size and the rotational velocity of the motor increases. At time $t_2$ the motor has reached a constant velocity with the new MAIM signal. At time $t_3$ the PWM signal is decreased by the step size back to the original PWM test point and the rotational velocity of the motor decreases. At time $t_4$ the motor has reached a constant velocity with the original PWM signal. At time $t_5$ the PWM signal is decreased by the step size and the rotational velocity of the motor decreases. At time $t_6$ the motor has reached a constant velocity with the new PWM signal. At time $t_7$ the PWM signal is increased by the step size back to the original PWM test point and the rotational velocity of the motor increases. At time $t_8$ the motor has reached a constant velocity with the original PWM signal.

This test cycle is repeated a number of time for each PWM test point, in one example the test cycle is repeated between 4 and 20 times, for example 11 times for each test point. The results for each test cycle can be averaged together or the mean value can be used. The encoder on each motor outputs a signal indicating the current position of the rotor. The position information can be used to determine the velocity and the acceleration of the motor. The acceleration of the motor and the inertia of the system can be used to determine the torque of the motor.

Each PWM test point is evaluated with the motor running in the forward and reverse rotational directions (clockwise and counter-clockwise). This results in four data points: the motor accelerating while turning in a forward or positive direction, the motor decelerating (acting as a brake) while turning in a forward or positive direction, the motor accelerating while turning in a reverse or negative direction, the motor decelerating (acting as a brake) while turning in a reverse or negative direction. The 4 data points for each PWM step can be plotted on a graph.

Figure 3:
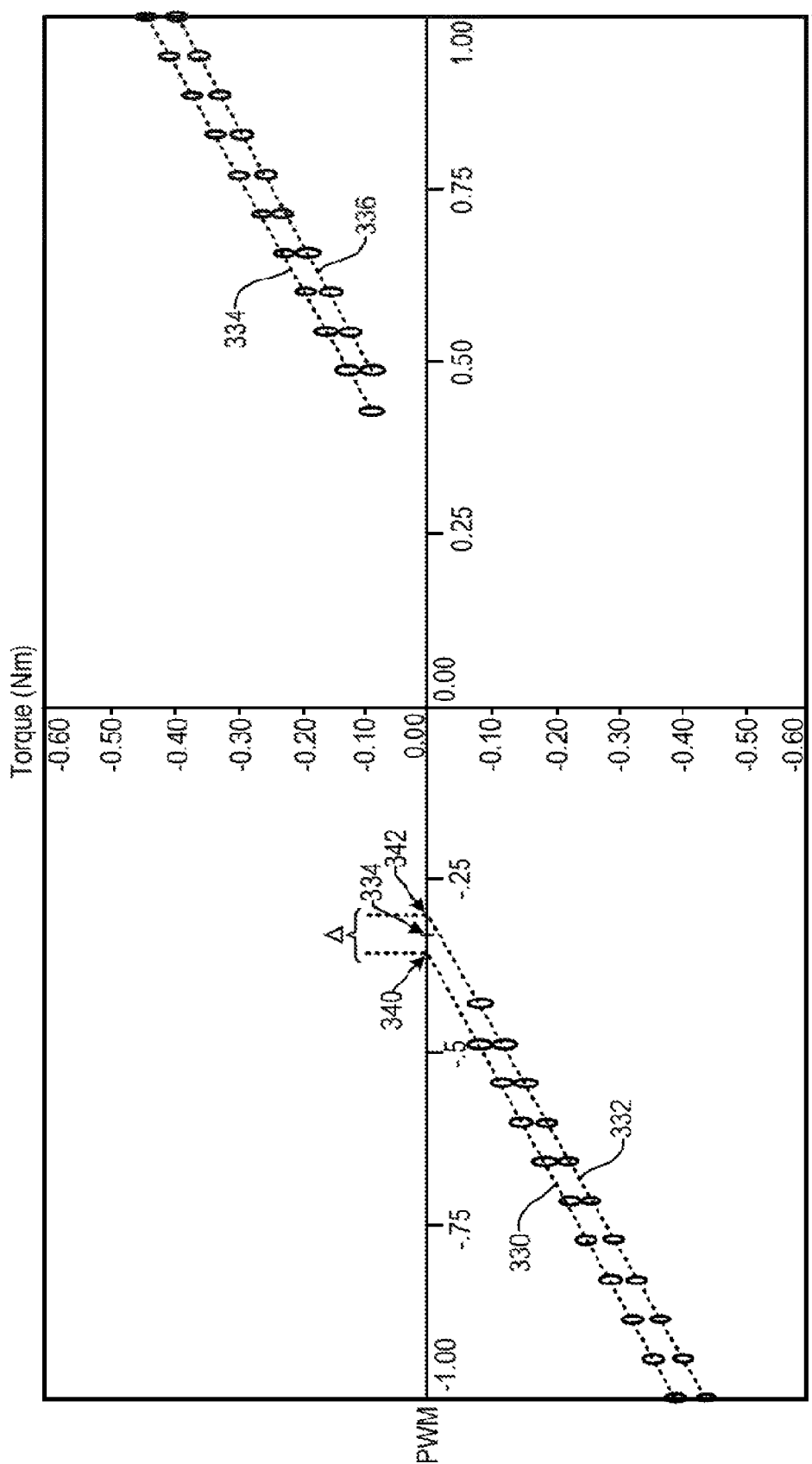
FIG. 3 is an example plot of the 4 data points for each PWM step.

FIG. 3 is an example plot of the 4 data points for each PWM test point. In FIG. 3 the horizontal axis (X-axis) is the PWM value and the vertical axis (Y-axis) is the torque. The PWM value has been normalized between zero and one with zero corresponding to a voltage of zero applied to the motor and a one corresponding to the maximum voltage applied to the motor. The upper right quadrant contains the measurements for when the motor is turning in a forwards or positive direction. The lower left quadrant contains the measurements for when the motor is turning in a backwards or negative direction. In this example an initial PWM value was used.

Line 330 is a linear fit to the PWM steps for when the motor is turning in a backwards or negative direction and the motor is decelerating or acting like a brake. Line 332 is a linear fit to the PWM steps for when the motor is turning in a backwards or negative direction and the motor is accelerating. Line 334 is a linear fit to the PWM steps for when the motor is turning in a forwards or positive direction and the motor is decelerating or acting like a brake. Line 336 is a linear fit to the PWM steps for when the motor is turning in a forwards or positive direction and the motor is accelerating.

The slope of each line is the torque constant for the motor. In this example, the motor being tested was installed in a printer and coupled to a media moving device by a transmission. The difference between the slope of two lines in each quadrant, for example lines 330 and 332, is the transmission efficiency. When a motor is tested without a transmission, the two lines in each quadrant typically overlap and the average value for each pair of lines is used as the torque constant.

The intersection of a line with the x-axis is the motors starting PWM value plus the motor friction for that direction. Arrow 340 indicates the x-axis intersection for line 330 and arrow 342 indicates the x-axis intersection for line 332. The intersection with the x-axis for the two lines is not the same. This is because the friction in the system is helping slow the motor down when the motor is decelerating (acting like a brake). The friction in the system is hindering/resisting the motor when the motor is accelerating. If we assume that the friction is the same when the motor is accelerating or decelerating, then the average value of the two line intersections with the x-axis is the motor starting PWM value (as shown by arrow 344). The difference between the two line intersections with the x-axis is Δ. The friction in the system for a given rotational direction (i.e. positive or negative) is Δ/2.

Each of the motors coupled to a media moving device is characterized. The motor characteristics for each motor are saved in a non-volatile memory. The media control system uses these characteristics to adjust the PWM signals sent to each motor. The motor characteristics that are saved comprise: the motor torque constants for when the motor is accelerating and when the motor is decelerating, the positive and negative PWM signals between which the motor does not rotate (i.e. the positive and negative starting values) and the friction in the system for both the positive and negative rotational directions.

Figure 4:
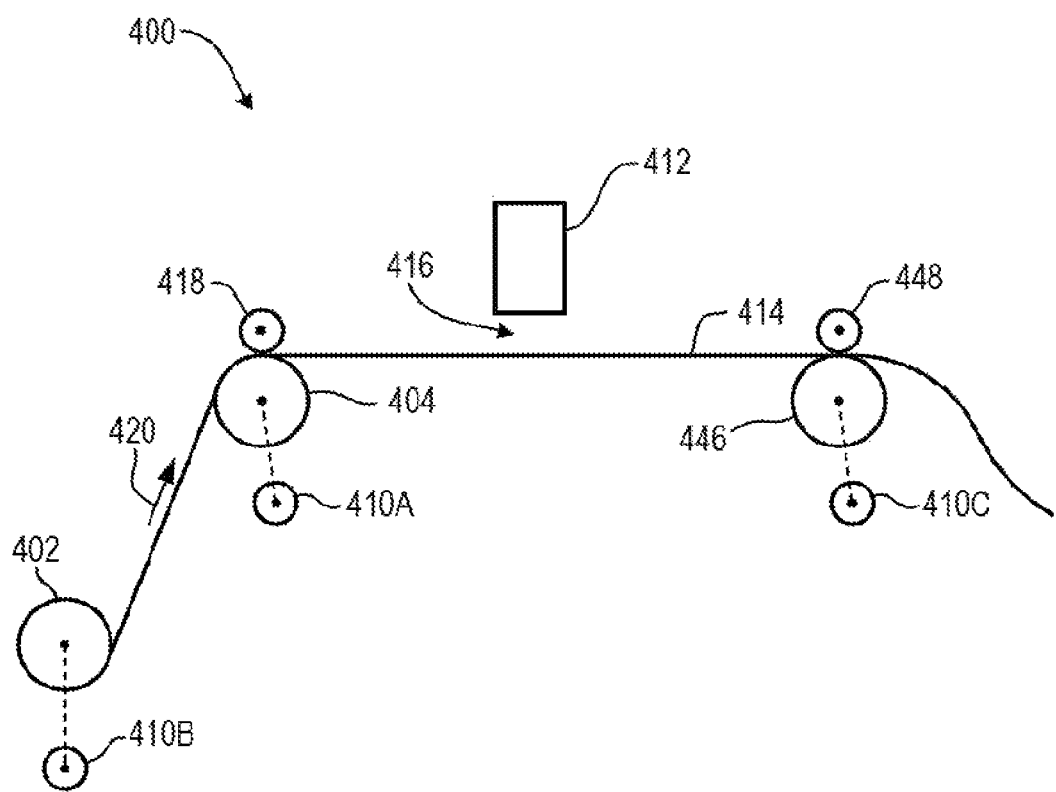
FIG. 4 is a diagram of another example printer 400.

FIG. 4 is a diagram of another example printer 400. Printer 400 is comparable in many aspects to printer 100. However unlike printer 100, the media is not collected by a take-up spindle. Printer 400 is known as a roll-to-floor printer. Printer 400 comprises a supply spindle 402, a drive roller 404, a first pinch roller 418, one or more printheads 412, a tension roller 446, a second pinch roller 448 and three motors 410A, 410B and 410C. A paper path starts at the supply spindle 402, then runs between drive roller 404 and first pinch roller 418, underneath the printheads 412, and between the tension roller 446 and second pinch roller 448. A print zone 416 is underneath pinheads 412. Media 414 is shown loaded in the paper path. During printing, the media travels in a print direction as shown by arrow 420.

Printheads 412 may navel across the media (in and out of the plain of the paper) during printing or may be a page wide array of printheads that stretch across the width of the media. The three motors 410A, 410B and 410C are coupled to the supply spindle 402, the drive roller 404 and the tension roller 408 respectively, with a transmission. The motors may be coupled to their respective media moving devices using any suitable transmission. For example the transmission may directly couple the motor to the media moving device, may use a belt drive, may use a set of gears, may have a clutch or the like. A media moving device is a mechanical device that interacts with the media to move the media in the paper path. The supply spindle 402, the drive roller 404 and the tension roller 446 are examples of media moving devices.

In one example the three motors 410A, 410B and 410C are brushless AC motors. There is an encoder integrated into each of the three motors. The encoder outputs a signal indicating the current rotational position of the rotor. Each motor also has a printed circuit assembly (PCA) integrated into the motor. The PCA controls the rotational speed of the motor. The input to the PCA is a pulse width modulation (PWM) number that corresponds to the voltage applied to the motor. The PWM signal is given as a percentage of the maximum voltage. A PWM signal of zero corresponds to zero voltage and a PWM of one corresponds to the maximum voltage.

The media control system sends the PWM signal to each of the three motors 410A, 410B and 410C to control the tension in the media. The tension is typically set at a different value for different types of media, for example paper, cloth or the like. The media control system uses motor characteristics to determine the appropriate PWM signal for each motor. The motor characteristics include at least the following characteristics: a torque constant, the positive and negative voltage values between which the motors don't turn (i.e. the starting PWM values) and the motor's friction for both rotational directions. The different characteristics will be determined for each of the three motors and stored into a non-volatile memory. By using the determined characteristics for each motor instead of an average or midpoint value, the media advance servo system can operate with less variation in the tension in the media.

Figure 5:
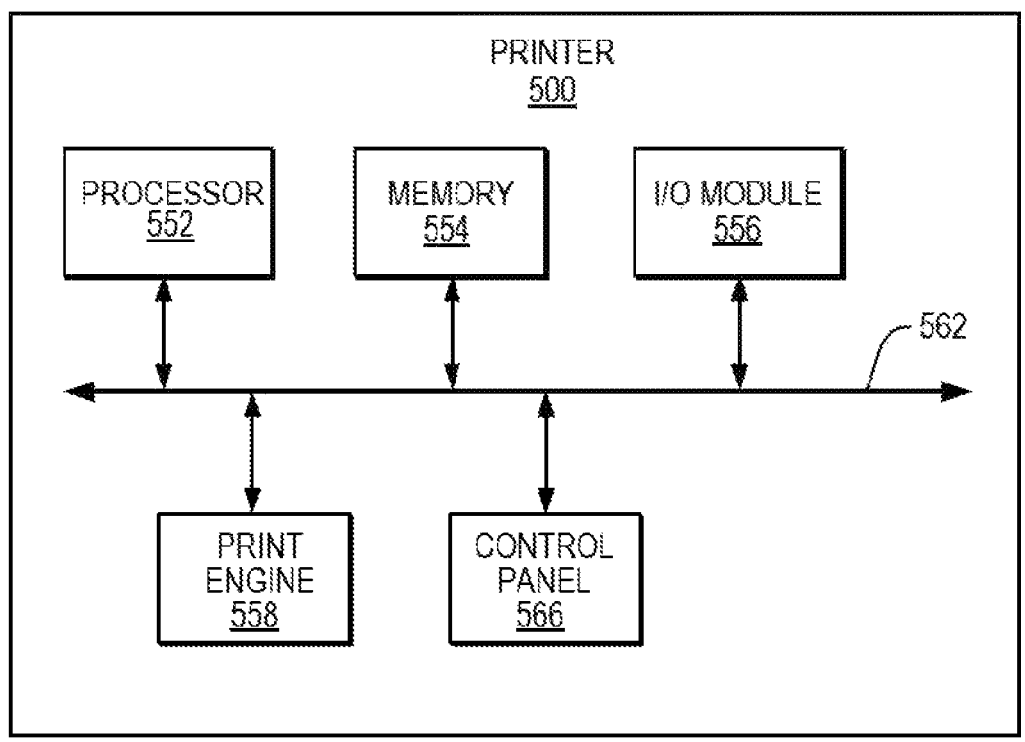
FIG. 5 is an electrical block diagram of an example printer 500.

FIG. 5 is an electrical block diagram of an example printer 500. The electrical block diagram could be used in either printer 100 or printer 400. Printer 500 comprises as processor 552, memory 554, input/output (I/O) module 556, print engine 558 and a control panel 566 all coupled together on bus 562. In some examples printer 500 may also have a user interface module, an input device, and the like, but these items are not shown for clarity. Processor 552 may comprise a central processing unit (CPU), a micro-processor, an application specific integrated circuit (ASIC), or as combination of these devices. Memory 554 may comprise volatile memory, non-volatile memory, and a storage device. Memory 554 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 556 is used to couple printer 500 to other devices, for example the Internet or a computer. Print engine 558 comprises a paper path with one or more media moving devices, motors connected to each media moving device and a print head. Printer 500 has computer executable code, typically called firmware, stored in the memory 554. The firmware is stored as computer readable instructions in the non-transitory computer readable medium (i.e. the memory 554). Processor 552 generally retrieves and executes the instructions stored in the non-transitory computer-readable medium to operate printer 500 and to execute functions. In one example processor 552 executes code that characterizes the motors in print engine 558.

Figure 6:
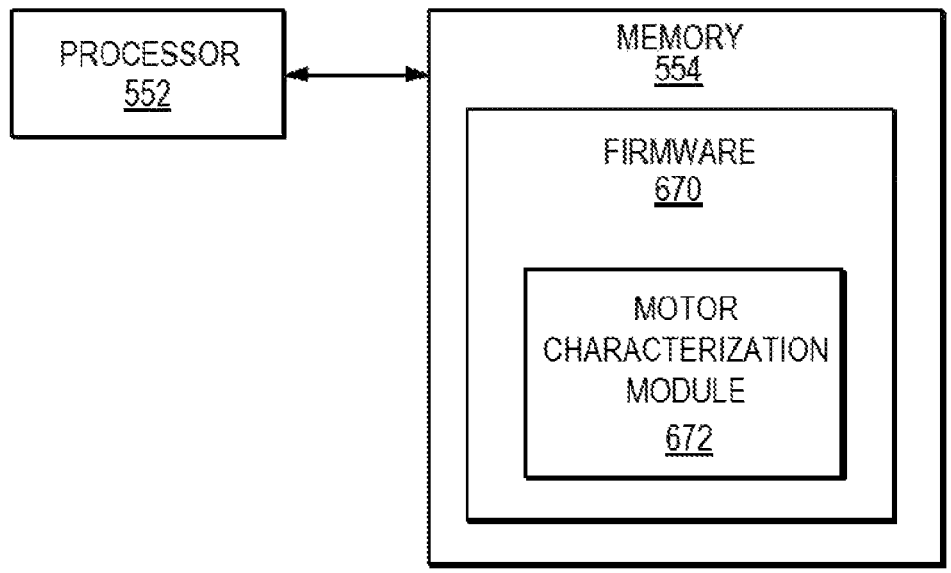
FIG. 6 is an example block diagram of the processor 552 coupled to memory 554.

FIG. 6 is an example block diagram of the processor 552 coupled to memory 554. Memory 554 contains firmware 670. Firmware 670 contains a motor characterization module 672. The processor 552 executes the code in motor characterization module 372 to characterize the motors coupled to the media moving devices in print engine 558.

Figure 7:
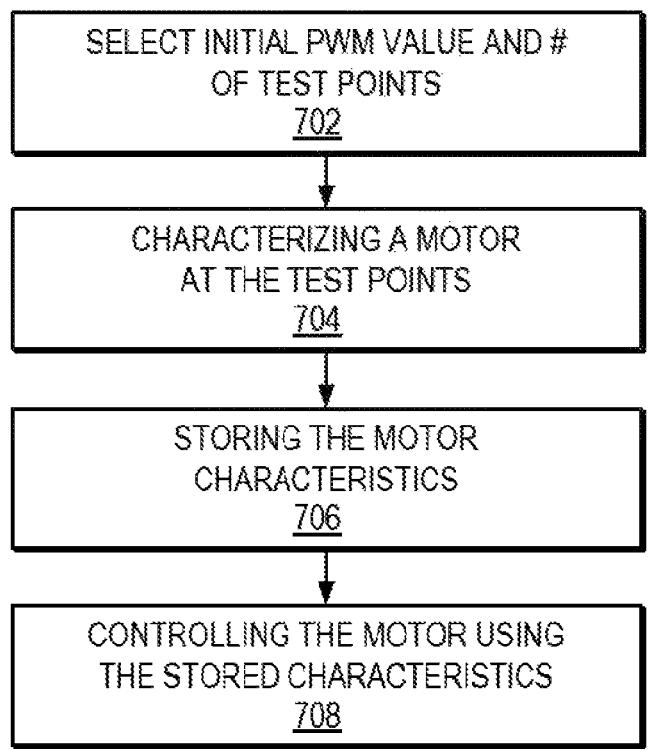
FIG. 7 is an example flow chart for a motor characterization module.

FIG. 7 is an example flow chart for a motor characterization module. Flow starts at 702 where an initial PWM value is selected and the number of test points is selected. In some examples the initial PWM value may be the starting value. Flow continues at 704 where a motor is characterized at each of the test points. The motor characteristics are determined by increasing and decreasing the PWM signal at each test point in both a positive and negative rotational direction. The motor characteristics determined at 704 may include: the motor torque constant in a positive and negative rotational direction, the positive and negative PWM value at which the motor does not turn and the friction in the system in both the positive and negative rotational directions. Flow continues at 706 where the motor characteristics are stored. Flow continues at 708 where the motor is controlled using the stored motor characteristics.

What is claimed is:

1. A printer, comprising:
    a media control system, the media control system having at least one motor coupled to a media moving device;
    a memory to store motor characteristics for the at least one motor;
    the media control system to control the tension in media loaded in a paper path using the at least one motor, the media control system using the stored motor characteristics to adjust a control signal to the at least one motor.

2. The printer of claim 1, wherein the motor characteristics comprise at least one of the following motor characteristics: a motor torque constant, a starting PWM value, and a system friction value.

3. The printer of claim 2, wherein the motor torque constant, the starting PWM value, and the system friction value include a value for a positive rotational direction and a negative rotational direction.

4. The printer of claim 1, wherein the first media moving device is selected from the following group of media moving devices: a supply spindle, a take-up spindle, a drive roller or a tension roller.

5. The printer of claim 1, wherein the media control system has three motors;
    the first motor coupled to a drive roller;
    a second motor coupled to a supply spindle;
    a third motor coupled to either a take-up spindle or a tension roller;
    the memory to store motor characteristics for each motor;
    the media control system to control the tension in media loaded in the paper path using the first, second and third motors, the media control system using the stored first, second and third motor characteristics to adjust a control signal to the three motors.

6. The printer of claim 1, further comprising:
    a controller, the controller to characterize the at least one motor and store the motor characteristics in the memory.

7. A method of calibrating a media control system, comprising:
    storing a plurality of motor characteristics in a non-volatile memory for at least one motor installed in the media control system;
    controlling the tension in media using the media control system by sending a control signal to the at least one motor based on the stored plurality of motor characteristics.

8. The method of claim 7, further comprising:
    characterizing the at least one motor to determine the plurality of motor characteristics after the at least one motor is installed in the media control system.

9. The method of claim 8, wherein characterizing the at least one motor further comprises:
    selecting an initial PWM value, a PWM step size and a plurality of PWM test point values;
    at each PWM test point value:
        setting a PWM signal to the motor at the PWM test point value;
        varying the PWM signal above and below the PWM test point value with the at least one motor turning in both a positive rotational direction and a negative rotational direction.

10. The method of claim 9, wherein characterizing the at least one motor further comprises:
    at each PWM test point value, determining a torque value for the motor and plotting the torque values vs. the PWM test point;
    fitting a line to the plotted torque values;
    setting the torque constant for the motor as the slope of the line;
    setting the starting PWM value as the intersection of the line with the axis of PWM values.

11. The method of claim 9, wherein characterizing the at least one motor further comprises:
    at each PWM test value determining the torque value when the motor is accelerating and decelerating in a positive rotational direction to create a first and second set of torque values and plotting the torque values vs. the PWM test point;
    at each PWM test value determining the torque value when the motor is accelerating and decelerating in a negative rotational direction to create a third and fourth set of torque values and plotting the torque values vs. the PWM test point;
    fitting a line to the four sets of plotted torque values;
    wherein a first friction for the system is the average value of the intersection of the first and second line with the PWM axis;
    wherein a second friction for the system is the average value of the intersection of the third and fourth line with the PWM axis.

12. The method of claim 8, wherein the media control system comprises three motors and each of the three motors are characterized to determine a plurality of motor characteristics.

13. The method of claim 7, wherein the motor characteristics comprise: a motor torque constant for a positive rotational direction and a negative rotational direction, a starting PWM value for a positive rotational direction and a negative rotational direction, and a system friction value for a positive rotational direction and a negative rotational direction.

14. The method of claim 7, wherein the at least one motor is coupled to one of the following media moving devices: a supply spindle, a take-up spindle, a drive roller or a tension roller.

15. A non-transitory computer readable medium containing computer executable instructions, that when executed by a processor in an printer, performs the following method, comprising:
    storing a plurality of motor characteristics in a non-volatile memory for at least one motor installed in the media control system;
    controlling the tension in media using the media control system by sending a control signal to the at least one motor based on the stored plurality of motor characteristics.

* * * * *